US007827523B2

(12) United States Patent
Ahmed et al.

(10) Patent No.: US 7,827,523 B2
(45) Date of Patent: Nov. 2, 2010

(54) QUERY SERVING INFRASTRUCTURE PROVIDING FLEXIBLE AND EXPANDABLE SUPPORT AND COMPILING INSTRUCTIONS

(75) Inventors: Nawaaz Ahmed, San Francisco, CA (US); Robert L. Travis, Jr., Casco, ME (US); Chad P. Walters, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1290 days.

(21) Appl. No.: 11/360,793

(22) Filed: Feb. 22, 2006

(65) Prior Publication Data

US 2007/0198484 A1 Aug. 23, 2007

(51) Int. Cl.
*G06F 9/44* (2006.01)
*G06F 9/445* (2006.01)

(52) U.S. Cl. .................. 717/106; 717/140; 707/709

(58) Field of Classification Search ......... 717/106–109, 717/114–116, 140–145; 707/203–204, 706–713
See application file for complete search history.

(56) References Cited

U.S. PATENT DOCUMENTS

| | | | | |
|---|---|---|---|---|
| 5,671,416 | A * | 9/1997 | Elson ...................... | 717/106 |
| 6,253,195 | B1 * | 6/2001 | Hudis et al. .............. | 707/713 |
| 6,253,367 | B1 * | 6/2001 | Tran et al. ................ | 717/108 |
| 6,397,206 | B1 * | 5/2002 | Hill et al. ................. | 707/713 |
| 6,578,192 | B1 * | 6/2003 | Boehme et al. .......... | 717/115 |
| 6,606,742 | B1 * | 8/2003 | Orton et al. .............. | 717/140 |
| 6,609,130 | B1 * | 8/2003 | Saulpaugh et al. ....... | 717/116 |
| 6,684,383 | B1 * | 1/2004 | Natori et al. ............. | 717/107 |
| 6,789,077 | B1 * | 9/2004 | Slaughter et al. ......... | 707/10 |
| 6,836,883 | B1 * | 12/2004 | Abrams et al. ........... | 717/140 |
| 6,862,594 | B1 * | 3/2005 | Saulpaugh et al. ....... | 707/10 |
| 6,973,640 | B2 * | 12/2005 | Little et al. ............... | 717/106 |
| 7,013,308 | B1 * | 3/2006 | Tunstall-Pedoe ......... | 707/709 |
| 7,185,192 | B1 * | 2/2007 | Kahn ....................... | 713/155 |
| 7,225,199 | B1 * | 5/2007 | Green et al. .............. | 707/102 |
| 7,329,913 | B2 * | 2/2008 | Brask et al. .............. | 257/287 |
| 7,331,037 | B2 * | 2/2008 | Dickey et al. ............ | 717/106 |
| 7,548,946 | B1 * | 6/2009 | Saulpaugh et al. ....... | 709/203 |

(Continued)

OTHER PUBLICATIONS

Arcelli et al, "An eclispe plug in for the java pathfinder runtime verification system", IEEE SEW, pp. 142-152, 2006.*

(Continued)

*Primary Examiner*—Anil Khatri
(74) *Attorney, Agent, or Firm*—Hickman Palermo Truong & Becker LLP; Daniel D. Ledesma

(57) ABSTRACT

A system and method for dynamically composing a class is provided. A query is parsed and a compiler object tree is generated that corresponds to the operators in the query. A set of feature requests and responses are initiated and a set of feature objects are generated that are executed at runtime. The language of the query may be extended by registering a new operator, and optionally a new feature for a query language, with a search engine without modifying the source code of the search engine. The new operator may be specified in a plug-in and provided to the search engine via the plug-in. An application converts an end user query into an application query that conforms to the query language supported by the search engine and includes the new operator. The application query may also include references to traditional programming constructs and search engine primitives.

43 Claims, 4 Drawing Sheets

U.S. PATENT DOCUMENTS 7,596,550 B2 * 9/2009 Mordvinov et al. ............ 707/3
7,743,362 B2 * 6/2010 Peck et al. .................. 717/109
7,774,335 B1 * 8/2010 Scofield et al. ............. 707/709

OTHER PUBLICATIONS

Cannon et al, "Automated object persistence for Java scripts", ACM IW3C2, pp. 191-200, 2010.*

Ren et al, "Heuristic ranking of Java program edits for fault localization", ACM ISSTA, pp. 239-249, 2007.*

Papi et al, "Practical pluggable types for Java", ACM ISSTA, pp. 201-211, 2008.*

* cited by examiner

QUERY SERVING INFRASTRUCTURE PROVIDING FLEXIBLE AND EXPANDABLE SUPPORT AND COMPILING INSTRUCTIONS

FIELD OF THE INVENTION

The present invention relates to query processing, and more particularly to providing a flexible and expandable query serving infrastructure.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A compiler is a computer program that translates a series of statements (source code) written in one language (called the source language) into output in another language (often called the object or target language). The output produced by a compiler typically takes the form of code that may be executed by a computer or a virtual machine.

To be processed correctly by the compiler, source code must conform to the source language. Source languages typically define a set of operators. Typically, the set of operators that may be used in the language, and the way a compiler translates each operator, is hard-coded into the compiler. Consequently, new operators may only be added to the language by re-writing the compiler to include support for the new operator. Re-writing a compiler to extend a language is a difficult task. Typically, such a re-write can only be performed by the developer of the compiler, since the compiler developer is usually the only one that has access to the source code of the compiler. Thus, parties that use the compiler are severely limited with respect to extending the source language supported by the compiler.

Compilers are used in a variety of contexts. For example, compilers are used within search engines to compile search queries received from search applications. A search application (also referred to herein simply as an "application") and a search engine are often developed and managed by different parties. To interact with third-party applications, search engines typically have a well-defined API for receiving and responding to search queries. Through the API, applications submit search queries to the search engine. To be properly processed by the search engine, the queries must conform to the query language supported by the search engine.

The process by which a query is received and executed typically begins with an end user inputting a query (i.e., "end user query") into a search field of an interface generated by an application. The end user queries themselves typically do not conform to the query language supported by the compiler used by the search engine. Consequently, the application converts the end user query into an "application query" that conforms to the query language supported by the compiler used by the search engine. The application then sends the application query to the search engine, where the application query is compiled and executed.

Since the search application is where the queries that are sent to the search engine are generated, the developer of the search application can be considered the "user" of the compiler. Thus, the application developer must design the search application in a manner that takes into account the limitations of the query language supported by the search engine's compiler. Because the application developer does not have the ability to re-write the compiler, the application developer usually has no ability to extend the language in which the application queries are formulated.

The compiler of a search engine includes routines for processing the operators included in the query language supported by the compiler. The operators that are initially supported by the compiler are referred to herein as "pre-supported operators". Unfortunately, the pre-supported operators may not provide all of the functionality desired by a search application developer. Theoretically, an application developer that wishes to have additional functionality may extend the query language supported by any search engine by modifying the source code of the compiler used by the search engine. However, as mentioned above, search applications and search engines are typically developed by different parties. Thus, a search application developer is not likely to have access to the source code of the search engine with which the developer's application interacts.

In addition to supporting only rigid query languages that are not easily extended, current search engines also do not provide general access to low level primitives, such as document selection and scoring operators, and are otherwise limited in that current search engines have a small set of fixed ways of handling queries. Values for such primitives are generated and used by the routines implemented in the search engine. However, the interface exposed to applications by the search engine does not provide any mechanism by which those applications can see or use those values.

Large scale search engines have the potential of supporting many different applications, such as user-adaptive query processing, data mining, complex algorithmic query execution for better relevance, etc. However, large scale search engines are currently programmed to handle only one or a fixed number of searching applications.

Because each application may serve widely diverse needs, different applications may indeed require different ranking functions, for instance. Unfortunately, document selection and ranking functions in current search engines are tightly coupled and thus are not easily customizable. For example, there is no current way for application developers to have application queries refer to document selection and ranking functions. Such functions are only accessible to routines internal to the search engine. Thus, application developers are unable to define new ways to select and rank documents.

Some search engines are publicly available. One such search engine is Lucene, which provides a relatively uncomplicated query language with Boolean operators and simple filters. However, similar to commercial search engines, the query language of Lucene is fixed. A publicly available research search engine which provides a more complicated query language is Indri. Indri, however, is also fixed and the retrieval model (i.e., document selection) is closely tied to the relevance model (i.e., document ranking). Thus, current search engines are not easily extensible and customizable with respect to selection and ranking operators.

DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

A framework is disclosed which allows the users of compilers to extend the language supported by the compilers. In one embodiment, a compiler user may effectively add an operator to the language supported by a compiler by providing the complier with a plug-in module for the operator. The plug-in module includes information used during both the compilation phase and the execution phase, to allow the compiler to correctly process statements that include the operator.

The framework may be applied to the context of search engines to produce a query serving architecture that allows a query language for a search engine to be extended. Specifically, a mechanism is provided that allows third parties, such as application developers, to define and use new operators in their application queries. In one embodiment, the new operators are registered with the search engine by providing a plug-in to the search engine, where the plug-in contains routines for handling the new operators.

According to one embodiment, a user, such as an application developer, conceives of a new operator and specifies, such as in a plug-in, how the new operator interfaces with other operators in the query language. When an application query with that new operator is received by the search engine, the search engine calls routines within the plug-in to determine how to handle the new operator.

In addition to enabling a query language to be extended, the query serving architecture described herein exposes data to applications that was previously available only to the search engine. The query serving architecture also allows the query language to be extended in order to support traditional programming constructs that were previously available only to programming languages.

Query Serving Architecture

Overview

Figure 1:
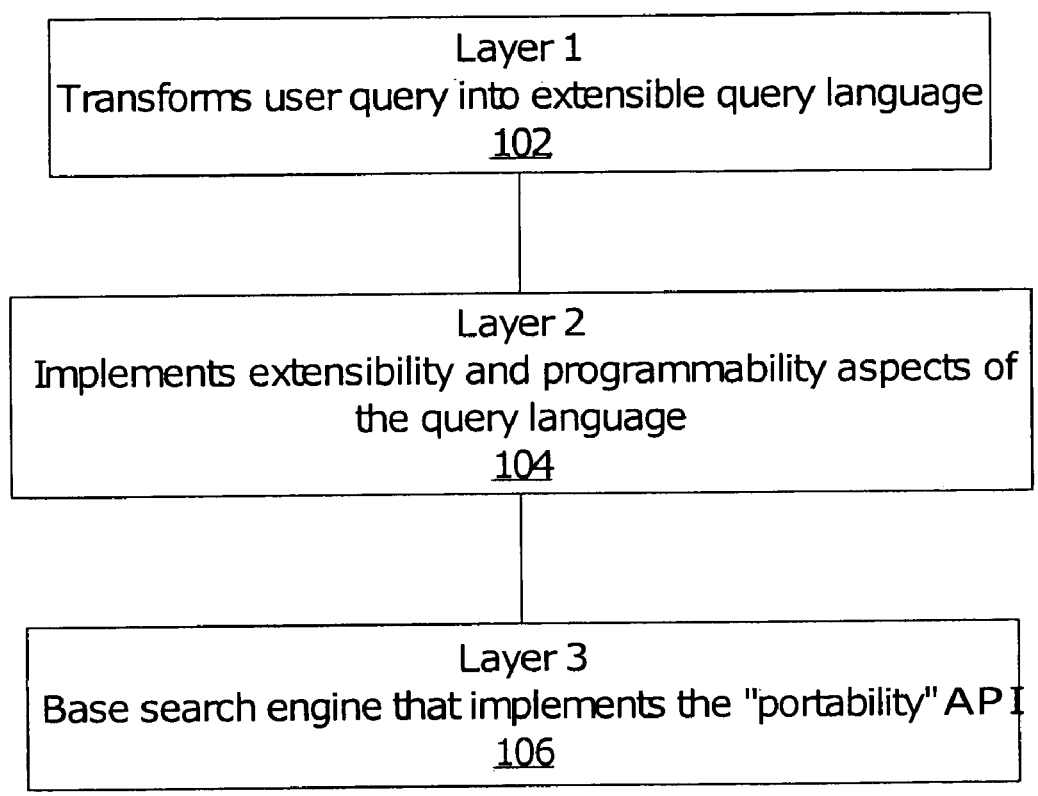
FIG. 1 is a block diagram that illustrates at least three layers of a new query serving architecture, according to an embodiment of the invention.

FIG. 1 is a block diagram that illustrates at least three layers of a new query serving architecture, according to an embodiment of the invention. Layer 1 of the new query serving architecture transforms a user query into an application query. The language used by the application query is an "extensible query language" in that the application query may use operators that are not pre-supported.

Layer 2 implements a compiler designed to support the extensible query language. The compiler uses several techniques, which shall be described in detail below, to provide the extensibility and programmability aspects of the query language.

Layer 3 is the base search engine. According to one embodiment, the base search engine implements a "portability" API. Operators employed in the transformed query (i.e. application query) are translated into executor objects which make calls to the base search engine through the system API. Because all interaction between the operators and the search engine is through the API, the query language framework may be easily ported to other base search engines that support the same API (i.e. search engines that expose equivalent features).

Embodiments of the invention are directed to elements and aspects of layer 2. In particular, the flexibility, extensibility, and programmability aspects of layer 2 will be discussed. An important thing to note is that the flexibility, extensibility, and programmability aspects of layer 2 together support the common goal of giving more power to the layer 1 component; these aspects are orthogonal to each other, i.e., they may be implemented independent of the other. Therefore, they will be discussed separately below.

Before illustrating the dynamic composition, extensibility, and programmability aspects of the query language, it is necessary to provide context by discussing features and operators in a query language.

Features

As used herein, the term "feature" refers to a type of information. Different features may have different formats. For example, a "zip code" feature may be represented by a number, while a "name" feature may be represented by a string.

In several embodiments, features play a predominant role in the extensible framework described herein. For example, the API to the base search engine is expressed in terms of features that may be requested from the search engine. Similarly, operators are defined in terms of the features that are able to produce. Thus, in the context of operators, features are analogous to output parameters of programming language functions.

For example, an operator inZIP(zipcode, cityname) may take a zipcode and cityname as input, and return a boolType feature. In the case of inZIP, the output will be TRUE if the city corresponding to cityname is in the zip code corresponding to zipcode, and FALSE if the city corresponding to cityname is not in the zip code corresponding to zipcode.

Some examples of feature types that may be exposed by a search engine API and/or returned by operators of a query language are 1) docStreamType: an ordered stream of documents containing a particular word or phrase,
2) posStreamType: a list of positions of a particular word in a particular document,
3) resultType: a double value,
4) scoreType: a double value that can take part in additive scoring, and
5) boolType: a boolean value.

According to one embodiment, the framework described herein handles operators that are polymorphic. A polymorphic operator is an operator that is able to return more than one type of feature. The specific feature returned by a polymorphic operator will vary based on the feature requests received. Polymorphic operators are discussed in more detail below.

As previously mentioned, an operator is defined in terms of the features it is able to produce. Consequently, the query serving architecture uses features as a mechanism for a first operator to communicate to a second operator what type of value is returned by the first operator.

For example, a generic application query may contain: "operator1(operator2(input))". To process this portion of the query, the search engine compiler determines whether the feature type returned by operator2 is the same as the data type that operator1 requires as input.

In one embodiment, the search engine has hard-coded support for pre-supported features and operators. Support for both new features and new operators may be added to the compiler used by a search engine using plug-ins. In another embodiment, the search engine does not include any "hard coded" features or operators. Instead, all features and operators (both new and pre-supported) are implemented using the plug-in mechanism.

Operator Characteristics

In one embodiment, operators in a query language are functional, polymorphic, and strongly-typed. An operator is polymorphic if the operator is able to return features of different types, based on which type of feature is being requested.

A strongly-typed operator is one that participates only in operations of the right type, i.e., feature. Thus, only operators with the right return type can take part as arguments to enclosing operators; other operators are ignored. In one embodiment, no type coercion is attempted on operators that don't support the right type.

For example, if an operator is defined to respond to requests that provide a docStream feature and the operator is provided a docStream feature along with other features, then the operator is still executed by accepting just the provided docStream feature. It is typically determined at compile time whether an operator is used properly in terms of the right type. An error may be generated if sufficient arguments of the right type are not found.

Feature Signature

The set of feature requests to which a particular operator responds is referred to herein as the "feature signature" of the operator. For example, the feature signature of the unit operator is docStream, posStream, and wordScore. As another example, the feature signature of the conditional ("cond{ }") operator is the union of the feature signatures of other operators, because cond{ } responds to all feature requests by comparing the feature requests against the feature signatures of other operators (i.e. its descendents), and forwarding the feature requests to other operators based on the comparison.

Adding an Operator

Overview

According to one embodiment, the language supported by a compiler may be extended to support new operators not included in the initial set of pre-supported operators. Significantly, the party that adds a new operator to the language need not have access to the source code of the compiler. Instead, the party includes all information required to support the new operator in a plug-in that is dynamically loadable by the compiler.

In general, the plug-in specifies the feature signature of the new operator, compile-time support for the operator, and run-time support for the operator. During compile time, the plug-in is used by the compiler to generate a compiler object for the operator. The compiler object, in turn, constructs feature objects for the operator. The feature object constructed by the compiler object is based on the feature request received by the compiler. Thus, the logic of the feature objects generated for the same operator may vary, as shall be described in greater detail hereafter. During runtime, methods of the feature objects constructed at compile time are executed to calculate the features required by the query.

As an example, the plug-in for an operator X may specify a feature signature for features A and B. In addition the plug-in includes a compiler object for operator X which determines how operator X responds to requests for features A and B. For example, the compiler object for operator X may determine that a certain piece of code Y must be executed to provide feature A, and another piece of code Z must be executed to provide feature B.

In this example, code Y and code Z are feature objects produced by operator X. Typically, the code of the feature objects for a particular operator are also included in, or calculated by, the plug-in for the operator. As shall be explained in greater detail hereafter, the feature objects themselves may invoke feature objects produced by other operators.

Feature Objects

In general, the compiler produces what are referred to herein as feature objects. Feature objects are query-specific, in that their logic is dictated by the query for which they have been constructed. Thus, even though two feature objects return the same type of feature (e.g. a docstream), the logic they encapsulate, and the actual information they return, may be completely different.

A feature object may be invoked by an application to obtain a feature produced by the query for which the feature object was constructed. A feature object may depend upon several other feature objects. Consequently, invoking a feature object may result in executing a feature object which, in turn, invokes other feature objects. The additional feature objects that are used to construct a feature object, and the relationships between them, are determined by the compiler based on a compiler object tree. Compiler object trees, and how the compiler uses such trees to generate feature objects for a query, are described in greater detail hereafter.

The Compiler Object Tree (COT)

Figure 2:
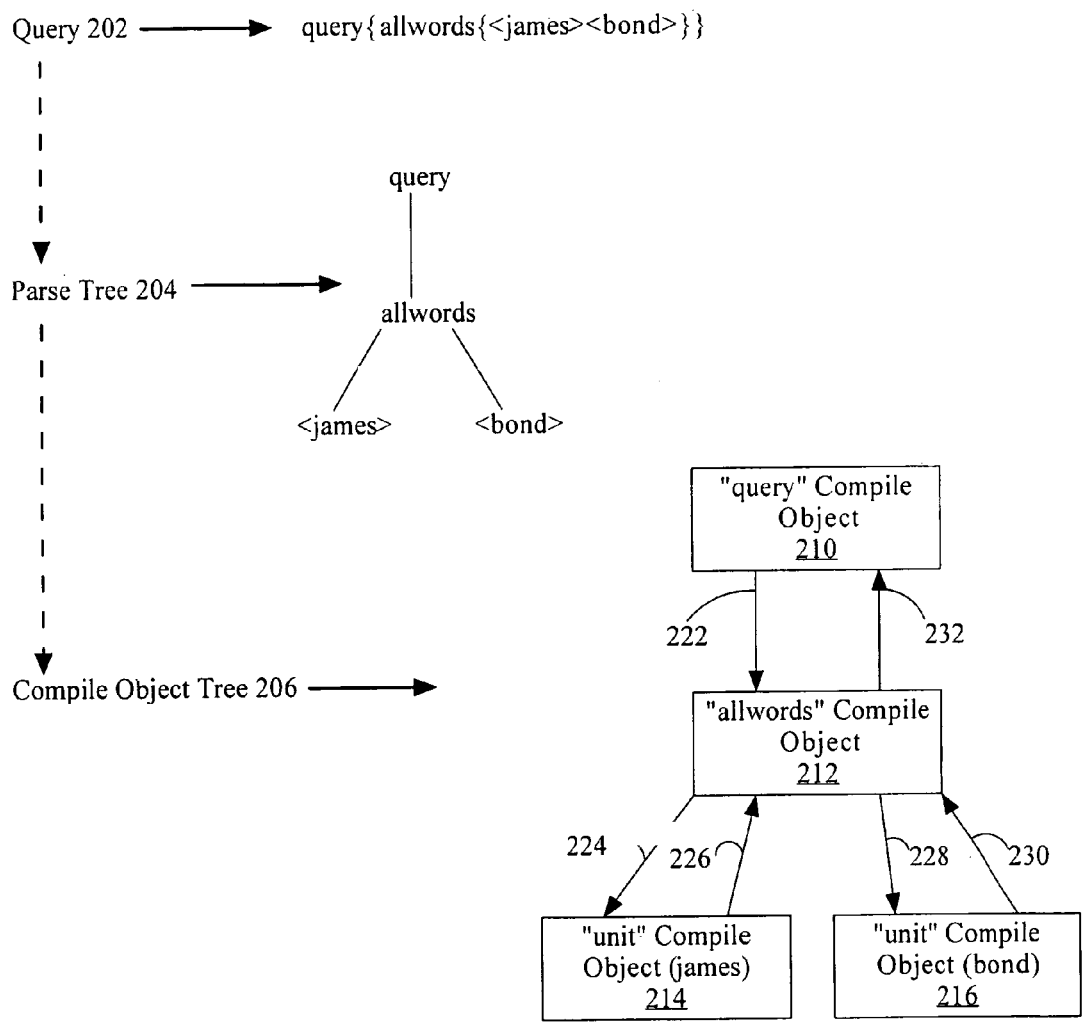
FIG. 2 illustrates a process for generating compile objects and feature requests and responses at compile time, based on a query, according to an embodiment of the invention.

FIG. 2 illustrates a process for generating, at compile time, feature objects based on a query, according to an embodiment of the invention. A query, such as query 202, is a sequence of characters. Within the compiler, the parser parses query 202 and creates a parse tree 204 based on query 202. Typically, the nodes of the parse tree are strings extracted from the original query. The nodes are linked together in a manner that reflects the syntax rules of the query language supported by the compiler.

Significantly, the parser does not know what the operators are going to be. The parser constructs the parse tree without reference to the plug-ins. Parser knows how to parse the query, and consequently how to construct the parse tree, based on the syntax of the language ({ }, alphabetic characters, commas, etc.).

At compile time, actual documents and other related data are not yet processed. Instead, the compilation process produces feature objects which, when executed, return a feature based on the logic of the query. The feature objects produced during the compilation phase are executed at "run-time".

According to one embodiment, query compilation is performed in three passes. First, query 202 is parsed into a parse tree 204. Second, compiler object tree 206 is generated based on parse tree 204, where each node in parse tree 204 corresponds to a compiler object in compiler object tree 206. Generating the compiler object tree involves type mapping based on name or form of operator. The type mapping is used, in conjunction with information provided from the registered plug-ins, to determine the compiler object that corresponds to any given parse tree node.

Typically, the structure of the compiler object tree will mirror the structure of the parse tree. However, rather than strings, the nodes of the compiler object tree are compiler objects supplied by the registered plug-ins. The compiler object of a node in the compiler object tree is supplied by the plug-in associated with the operator that matches the corresponding node in the parse tree.

The compiler object used for an operator determines the semantics of the operator. Thus, when the plug-in associated with an operator changes, the compiler object used for the operator changes, thereby changing the semantics of the operator.

Third, a number of feature requests are made by the search application. Each feature request may result in a sequence of other feature requests and responses. For example, the "query" node in parse tree 204 corresponds to a compiler object 210 and a feature request 222 causes feature requests and responses 224-232 to be generated. A response to a feature request at compile time specifies at least one feature object that at runtime executes (e.g., computes a score component associated with a specific document in a database).

Using the Compiler Object Tree to Compose Feature Objects in Response to Feature Requests Once the compiler object tree has been generated for a query, the compiler object tree may be used to compose feature objects that encapsulate the logic for answering application-generated feature requests. When an application-generated feature request arrives, it is initially passed to the root node of the compiler object tree. In this case, it is passed to a "query" compiler object 210 of FIG. 2.

In the context of a search engine, the application may generate three initial feature requests. According to the example given in FIG. 2, the first request may be a request for "word info". The "word info" feature request would be received by query compiler object 210 and then traverse down the tree (feature requests 222, 224, and 228) until the "word infor" feature request arrives at "unit" compiler objects 214 and 216. Unit compiler objects are the only compiler objects that know how to respond to "word info" requests. Each unit returns one 'word info' feature object (thus, in the example, feature responses 226 and 230 are returned). The feature object returned by unit compiler object 214 describes the word info of "james". The feature object returned by unit compiler object 216 describes the word info of "bond". The two feature objects corresponding to the word info of "james" and "bond" are passed (via feature response 232) to the application that sent the feature request.

The next feature request is a "docStream" feature request. The "allwords" compiler object 212 and the "unit" compiler objects 214-216 are involved in responding to the docStream feature request. "Allwords" compiler object 212 handles the docStream request by (1) generating a feature request to all unit compiler objects below it, and (2) forming composite response feature object. In this example, the feature object is a single docStream feature object that receives input from the docStream feature objects that are generated by the various unit compiler objects. In this particular example, the "Allwords" docStream feature object includes code for generating the intersection of the docStreams received from feature objects that are generated by unit compiler objects 214-216.

The next feature request may be a score feature request. "Allwords" compiler object 212 again generates a feature request to all unit compiler objects below it and forms a single feature object. In this case, the feature object formed by the "Allwords" compiler object is a score feature object that uses input from the scores that it receives from the feature objects generated by the various unit compiler objects. In this particular example, the score feature object may include code for summing the scores received from the feature objects generated by the unit compiler objects 214-216. In order to improve code optimization possibilities, the various score feature objects may provide methods to return more generic calculation objects that are capable of further integration and optimization for runtime efficiency; we may sometimes refer to these calculation objects generically as 'execution objects'.

In summary, the compiler mediates the communication of feature requests and responses. The compiler determines which portions of code, provided by the compile objects, communicate with each other. Thus, the compiler informs the execution engine what to execute and what values are to be passed to which portions of code.

Because documents and other related data are not processed at compile time, for a given feature request which implies per-document feature calculation, the returned feature object contains within itself the specification of an execution object that, when executed at execution time, calculates the feature. An example of a feature request that does not imply per-document feature calculation is the "word info" feature request. For each feature request that does implies per-document feature calculation (e.g. score feature request), the associated set of returned execution objects (and their dependencies) is explored to extract a precedence-ordered sequence of those execution objects. At runtime, the ordered sequence of execution objects is "executed" for each document in a document stream. The runtime environment thus orchestrates the execution of all code that was specified as a response to each feature request.

Attributes

Queries may contain explicit references to attributes. An attribute is a parameter, associated with an operator of the query, that affects how the compiler object that is created for the operator will respond to specified types of feature requests. Attributes are typically used to override the default functionality of the compiler object for a particular compiler object. According to one embodiment, support is provided for a "participate" attribute and a "transparent" attribute.

The attribute Participate.docstream=0, if specified for an operator, instructs the compiler object for that operator to not respond to docstream feature requests. An example of an application query using the "participate" attribute is the following:

query{allwords
{<james><bond.participate.docStream=0>}}

Having the "participate" attribute set to zero in this example means that the unit operator for "bond" will not respond to a request for a docStream feature. On the other hand, when requested for a wordScore feature, the unit operator for "bond" will respond (i.e. the default functionality of the unit operator is to respond to requests for a wordScore feature). Therefore, according to this example, "bond" is an optional term that contributes to the overall score but does not limit the selection of documents.

Another example of an attribute is "transparent". An example of an application query using the "transparent" attribute is the following:

query{allwords {<james><bond>}, transparent.wordScore=1}

In this example, the "transparent" attribute is applied to the operator allwords, which returns a wordScore feature. If the operator allwords receives a request for a wordScore feature, allwords will also send the request to its descendants (i.e. both unit operators in this case). Thus, in this example, not only will allwords respond to a wordScore request, but allwords will also allow its descendants to respond to such a request.

Dynamic Class Composition

From an object-oriented perspective, each query may be considered to be a class. As a class, the query has certain methods. In the case of a query, the methods correspond to the features that the query is able to provide. The class can be compiled to create an instance of the class. The instance of a class includes the implementation of the methods of the class. Once an instance of the class has been created, the methods of the instance can be invoked.

Using the compilation techniques described herein, class composition is performed dynamically. Specifically, the logic of the function that is executed to return a feature for a query is dynamically constructed by the compiler based on (1) the query, and (2) the plug-ins that define the operators used by the query. Consequently, the "docstream" function constructed by the compiler for one query may have entirely different logic than the "docstream" function constructed by the compiler for another query. Even for the same query, the logic of the "docstream" function produced by the compiler may change if the plug-in for a particular operator used by the query is changed.

Query Serving Architecture

According to one embodiment, a query serving infrastructure is provided that has three main parts: 1) a language for representing queries; 2) a runtime environment for providing services to an application query while executing; and 3) a framework for developing and incorporating new document selection and ranking primitives by exposing, to applications that use a search engine, data previously available only to the internal routines of the search engine.

Extending the Query Language

Figure 3:
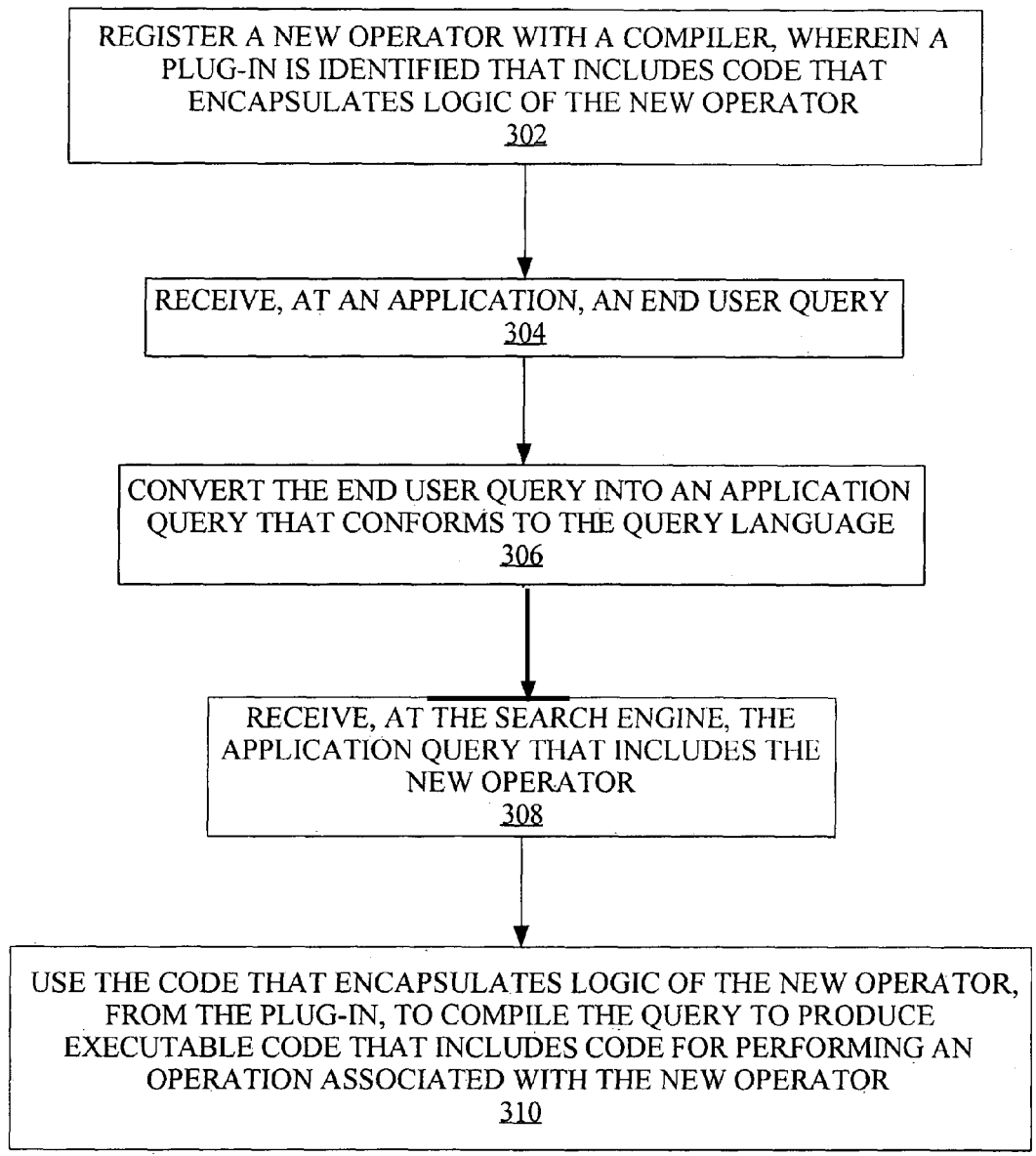
FIG. 3 is a flow diagram that illustrates a process for extending a query language used to submit application queries to a search engine without modifying the search engine, according to an embodiment of the invention.

FIG. 3 is a flow diagram that illustrates a process for extending a query language used to submit application queries to a search engine without modifying the existing components of the search engine, according to an embodiment of the invention. Although this example is in the context of search engines, embodiments of the invention may also be used in environments unrelated to search engines.

A user, such as an application developer, conceives of a new operator and specifies, e.g., in a plug-in, how the new operator interfaces with other operators in the query language. The application developer registers the new operator with the query language compiler associated with the search engine (block 302). The step of registering includes identifying a plug-in that includes code that encapsulates logic of the new operator.

According to one embodiment, plug-ins for new operators have a compilation portion and a runtime portion. In the compilation portion of plug-in, the application developer includes information that is used by the query language compiler to plan connections between executable portions of code. Specifically, the compilation portion of the plug-in 1) informs the compiler which features the plug-in can produce and 2) presents the compiler with a handler that can produce a feature of the right type. The runtime portion of the plug-in provides access to data or carries out an operation on the runtime input.

The extensibility aspect of the query language is due, in part, to both the plug-in mechanism and the functional language design and syntax.

As indicated above, all operators implemented by the search engine may be new operators in the sense that all operators are added to the search engine via a plug-in.

Using the Extended Query Language

After a query language has been extended using the plug-in technique described above, an application can make use of the extended language by including new operators in the application queries that it sends to the search engine. Specifically, an end user may be sent a webpage by the application that provides an interface to allow end users to enter and submit an end user query. The application receives the end user query (block 304) and converts the end user query into an application query that conforms to the query language (block 306), e.g., via application-specific query rewriting modules. The application query may include one or more new operators (operators that were not in the set of pre-supported operators provided by the compiler maker).

The application then sends the application query to the search engine (block 308) to be compiled. The process of compilation described above with reference to FIG. 2 may be used to compile the application query. In the case where an application query sent to the search engine includes a new operator, the code that encapsulates logic of the new operator, from the plug-in, is used to compile the query to produce executable code that includes code for performing an operation associated with the new operator (block 310 of FIG. 3). Multiple routines may be invoked, depending upon the features supported by the version of the operator implemented by the specific plug-in.

During execution of the compiled query, an initial set of documents from a database (associated with the search engine) is selected and a set of features are calculated. The execution engine gathers search results of the executed query and provides the search results back to the application that sent the application query. The application then provides the search results to the end user, e.g., via a graphical user interface.

An example of an operator that may be specifically defined by an application developer and added to the query serving architecture is an operator that calculates the score of a particular web document. Such a score operator may take as parameters multiple combinations of features. For instance, one version of a score operator may calculate the score of a particular document based on input parameters corresponding to any combination of query dependent features, such as the cumulative word score, proximity score, and title match score. Query independent features on which a score operator may be based are spam factor and other quality factors of the particular web document. Other versions of the score operator may take into account any combination of the above features.

Embodiments of the invention are not limited to where the compiler and execution engine reside relative to each other. For instance, in one embodiment, the compiler and execution engine reside on the same device. However, in another embodiment, the compiler and execution engine reside on separate devices.

Central Infrastructure

In one embodiment, the process of compiling and executing an application query is managed by a central infrastructure. The central architecture, including the compiler and the runtime environment, manages the interactions between operators defined in plug-ins, thus allowing an application developer to write a plug-in without having to know about all the processes and components involved in the compilation and execution phases. The application developer simply needs to obey some basic rules. For instance, an application developer specifying a new operator must know the features with which the new operator interacts. The developer does not need to know specifics about the compiler or the execution engine. The developer simply specifies what the interactions between the new operators and (1) other operators and/or (2) the search engine, need to be.

In sum, when defining a new operator, the application developer specifies which feature requests the new operator will respond to. For each feature request, the developer provides code that requests any inputs from other operators (i.e., input parameters). At compile time, those other operators will appear below the new operator in the compiler object tree.

Thus, operators in the query language disclosed herein communicate with other operators in terms of data types, which are these features. Because a given feature may require some execution in order to be computed (e.g. one feature depends on other features), there is an implied execution path. A feasible execution path is eventually generated that calculates the lower basic features (e.g. docStream feature) first, before executing the code associated with the features required at higher levels in the compiler object tree.

Retargetable Query Language

According to one embodiment, a system API defines the interface between the compiler and the runtime environment. The system API exposes features that may be requested by operators. In one embodiment, the API specifies what low level routines must accomplish in executing an application query.

Because all interaction between the compiler and the runtime environment are through the API, the compiler may be easily ported to any runtime environment that supports an equivalent API. When retargeting the compiler to a new runtime environment, the set of operators that comprise the language (including new operators added using user-provided plug-ins) do not need to be changed; only the implementation of the system API changes.

Exposing Search Engine Primitives

The extended query language contains constructs that allow the application to specify how to select documents from a database, how to rank selected documents, and how to calculate and export data back to the application that sent the application query.

Basic primitives of query languages are operators which encapsulate either a piece of data available to the search engine or an execution primitive that tells the search engine how to act on the piece of data. Exposing basic primitives through the extended query language allows applications to use the extended query language to control all aspects of query execution.

The new query serving architecture thus abstracts the basics of searching in a database and makes the basics of searching available to operators as primitives. Application developers may then specify new operators consisting of more complicated primitives and make the new operators available to the query language.

According to one embodiment of the invention, an application query is able to include an explicit or implicit reference to at least one search engine primitive. Search engine primitives include, but are not limited to, the following features and operators:

docStream and posStream features; and unit operators (e.g., < >) that expose access to the underlying search database and that return either a docStream, posStream, or wordScore feature;

An example of an application query that includes an explicit or implicit reference to one of these primitives is the following:

```
query{
    allwords {
        <new york> <hotels>
    }
    rank{
        [<new york> <ny> <manhattan>]
        [<hotels> <hotel> <accommodation>]
    }
    , numResults=20, uniqueByHost=2
}
```

In this example, query{ } produces an execution plan by first generating a compiler object tree, such as tree of FIG. 3. The operator allwords{ } requests features of the type docStream, which causes the unit operator (< >) to be invoked. Through the rank{ }operator, the words "new york", "ny", and "Manhattan" are treated as equivalent, using the equivalence ([ ]) operator. The words "hotels", "hotel", and "accommodation" are also treated as equivalent with each other. The parameters numResults and uniqueByHost to query{ } indicate that the number of documents ultimately returned to the end user will be twenty and that no more than two documents in the results come from the same host server.

In response to receiving, at the search engine, an application query that includes an explicit or implicit reference to a search engine primitive, the compiler compiles the application query. The search engine then performs an operation that is based, at least in part, on the search engine primitive explicitly or implicitly referenced in the application query.

By breaking down a query language into the query language's more atomic constituents the query language can be applied in more creative ways by a higher level application even without defining new query operators and new features.

Programmable Query Language

Another approach to enhancing a search engine is to make the search engine programmable by providing a query language that allows the search application to precisely control all aspects of the execution of the application query in the search engine. The search engine may then be customized to suit the specific needs of various applications. The extended query language provides access to the data stored in the search engine in a programmable way (meaning application queries in the extended query language may specify query plans as if the query was written in a high-level programming language), and may be further extended to provide access to additional internal data, as required. This allows applications to treat the search engine as a programmable calculator, allowing each application to uniquely customize query execution on a per query basis.

According to one embodiment of the invention, a search engine is able to properly handle application queries that include traditional programming constructs. The query language supported by the search engine allows an application query to include at least one programming construct from the following programming constructs:

variable assignment (e.g., using the let{ } operator), conditional execution (e.g., using the cond{ } operator), and list comprehension constructs (such as list and filter).

An example of variable assignment expression in an application query is the following:

```
let{
    assign{ <w1><w2><w3>, name=words}
    sum{ r1 {use{,name=words} r2{use{,name=words} } }
}
```

In this example, the words <w1>, <w2>, and <w3> are assigned to the "name=words" variable. If the let, assign, and use constructs were not available, the application query would have to be written as the following:

sum{r1{<w1><w2><w3>}r2{<w1><w2><w3>}}

An example of a conditional expression in an application query is the following:

```
cond{
    ge{ countBody{<foo>} d{,d=10} }
    d{,d=10.0}
    d{,d=0.0}
}
```

In this example, countBody{ } returns the number of times in a particular document the word <foo> appears. The ge{ } operator determines whether the result of countBody{ } is greater than or equal to 10. If the result of ge{ } is true, then 10 is returned; otherwise 0 is returned.

Conditional operators (e.g. cond{ }) extend document selection and document scoring capabilities. Conditional operators are general, in the sense that they can switch any kind of feature request. In other words, incoming feature requests are directed to the proper "child" (i.e., function call within an operator to another operator) independent of what the request is. By contrast, other operators either respond directly to a request (if the request is of a type the operator is designed to handle), pass the request unchanged to their children (if the operator is designed to be "transparent"), or block the request unconditionally (if the operator is designed to be "opaque"). For example, these other operators include generic calculation operators which are more limited, although quite useful, in that they primarily respond to and operate on the result feature request.

Based on the foregoing embodiments, the new query serving architecture is extensible, retargetable, and programmable. The "expressiveness" of the query serving architecture makes it possible to easily prototype and deploy new applications (such as new relevance algorithms, verticals that need access to web data, etc.) that use the search engine. As the underlying search engine evolves to provide richer sources of data, new operators to expose that data are readily added to the language, e.g., through the plug-in facility. As the technology for understanding user intent improves, the query serving architecture allows customizing query execution to better reflect that intent.

Hardware Overview

Figure 4:
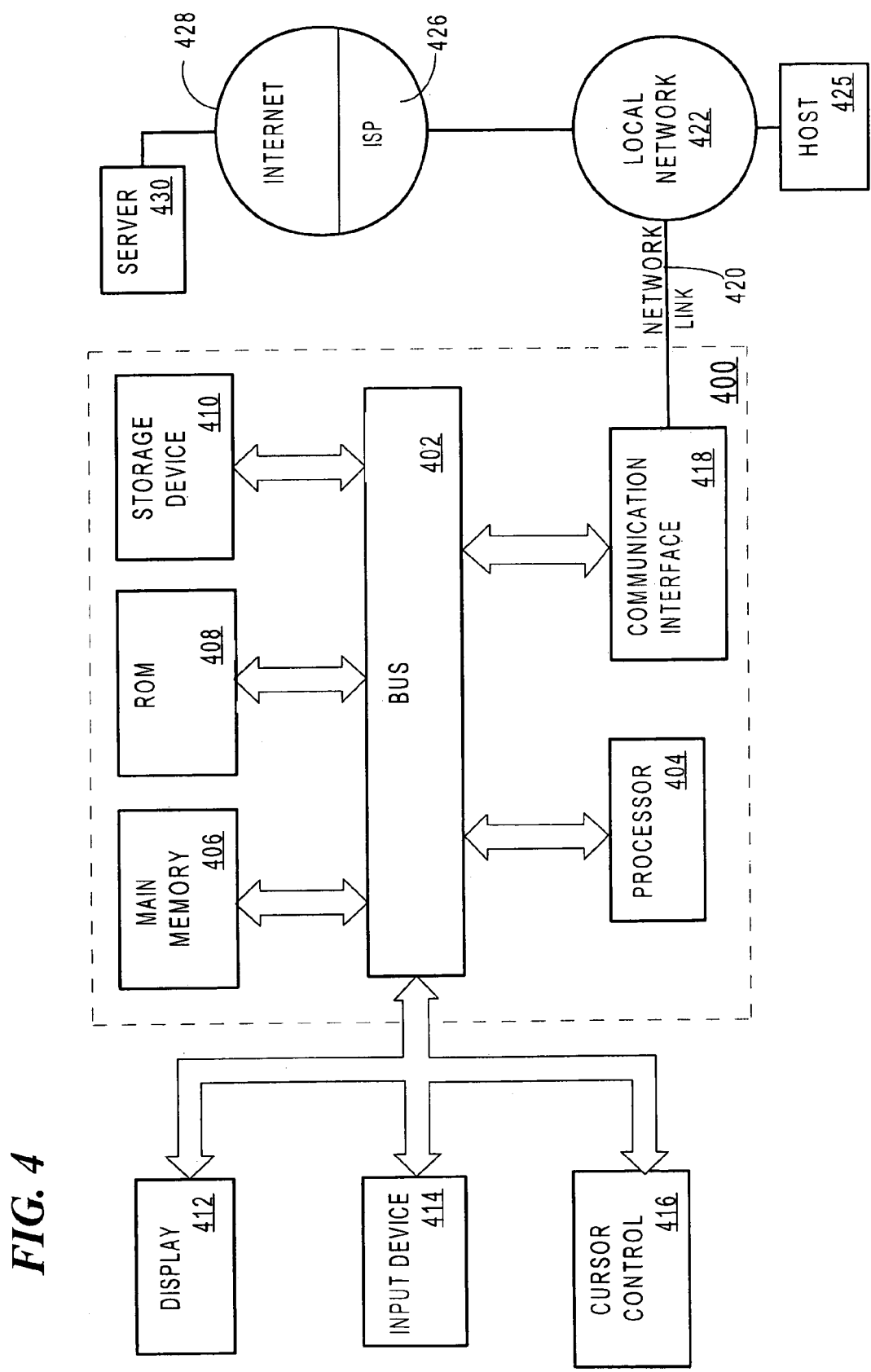
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for dynamic class composition, the method comprising the steps of:
   receiving, at a compiler, a statement that conforms to syntax rules of a language supported by the compiler;
   wherein the statement includes a particular construct; and
   compiling the statement, wherein the step of compiling the statement includes the compiler performing the steps of:
   dynamically loading a plug-in;
   obtaining, from the plug-in, code for use in compiling statements that include said particular construct; and
   using said code to generate executable code for said statement;
   wherein the particular construct is a construct for which support was not provided by the designer of the compiler;
   wherein the plug-in is provided by a party other than the designer of the compiler;
   wherein the method is performed by one or more computing devices.

2. The method of claim 1 wherein the step of obtaining code includes obtaining an execution object that includes code which, when executed, performs a function associated with said particular construct.

3. The method of claim 1 wherein the step of compiling the statement includes:
   creating a parse tree by parsing the statement based on the syntax rules of the language;
   generating, based on the parse tree, a compiler object tree that comprises a plurality of compiler objects, wherein each compiler object corresponds to a construct in said statement; and
   obtaining the compiler object for said particular construct from the plug-in.

4. The method of claim 3 wherein:
   the language supported by the compiler is a query language;
   the statement is a query for providing one or more features;
   the particular construct is a particular operator contained in the query; and
   the each compiler object in the compiler object tree corresponds to an operator in said query.

5. The method of claim 4 wherein the step of compiling the statement includes generating a feature object which, when executed, returns a feature based on the query.

6. The method of claim 5 wherein the step of generating a feature object includes:

sending feature requests to one or more compiler objects in said compiler object tree; and wherein each compiler object contains logic for determining how to respond to feature requests, wherein the logic reflects the semantics of the operator to which the compiler object corresponds.

7. The method of claim 6 wherein:
said particular operator is a polymorphic operator; and
said compiler object for said particular operator is designed to respond to multiple types of feature requests.

8. The method of claim 7 wherein the compiler object for the particular operator includes logic for:
providing a first feature object in response to a request for a first type of feature; and
providing a second feature object in response to a request for a second type of feature that is different than the first type of feature;
wherein the logic of the first feature object is different than the logic of the second feature object.

9. The method of claim 6, wherein:
the query includes a participate attribute associated with the particular operator; and
the participate attribute determines whether the compiler object associated with the particular operator responds to a feature request.

10. The method of claim 6, wherein:
the query includes a transparency attribute associated with the particular operator; and
the transparency attribute determines whether the compiler object associated with the particular operator forwards a feature request to a different compiler object in the compiler object tree.

11. The method of claim 5, wherein at least one of the one or more compiler objects responds to the feature requests by providing an execution object used to construct a feature value for an applicable document.

12. The method of claim 5 wherein the step of generating a feature object includes obtaining one or more additional feature objects used to construct the feature object by traversing the feature request down a relative portion of the compiler object tree, beginning with a current compiler object of the compiler object tree.

13. The method of claim 12 wherein the step of traversing includes each compiler object that receives a feature request for a particular feature determining whether to:
pass the feature request to compiler objects that reside below the compiler object in the compiler object tree;
ignore the feature request without passing the request to compiler objects that reside below the compiler object in the compiler object tree; or
provide a feature object for use in constructing said particular feature, wherein the feature object that encapsulates how the operator represented by the compiler object generates the particular feature identified in said feature request.

14. The method of claim 13 wherein the step of traversing includes:
sending feature requests to compiler objects that reside below a particular compiler object when the operator represented by the particular compiler object requires features from the operators represented by the compiler objects that reside below the particular compiler object.

15. The method of claim 13 wherein the step of determining is based, at least in part, on attributes, specified in the query, for the operator associated with the compiler object.

16. One or more storage-readable media storing instructions which, when executed, cause the performance of the method recited in claim 1.

17. A method for dynamic class composition, the method comprising the steps of:
receiving, at a compiler, a statement that conforms to syntax rules of a language supported by the compiler;
wherein the language supported by the compiler is a query language;
wherein the statement is a query for providing one or more features;
wherein the statement includes a particular construct; and
wherein the particular construct is a particular operator contained in the query;
compiling the statement, wherein the step of compiling the statement includes the compiler performing the steps of:
creating a parse tree by parsing the statement based on the syntax rules of the language;
generating, based on the parse tree, a compiler object tree that comprises a plurality of compiler objects, wherein each compiler object corresponds to a construct in said statement;
wherein the each compiler object in the compiler object tree corresponds to an operator in said query;
receiving, from an application, one or more feature requests;
in response to receiving the one or more feature requests, issuing requests to compiler objects in the compiler object tree to obtain a plurality of feature objects; and
generating executable code for said statement based on the plurality of feature objects;
wherein the step of generating executable code includes generating a feature object which, when executed, returns a feature based on the query;
wherein the step of generating a feature object includes obtaining one or more additional feature objects used to construct the feature object by traversing the feature request down a relevant portion of the compiler object tree, beginning with a current compiler object of the compiler object tree;
wherein the step of traversing includes each compiler object that receives a feature request for a particular feature determining whether to:
pass the feature request to compiler objects that reside below the compiler object in the compiler object tree;
ignore the feature request without passing the request to compiler objects that reside below the compiler object in the compiler object tree; and
provide a feature object for use in constructing said particular feature, wherein the feature object that encapsulates how the operator represented by the compiler object generates the particular feature identified in said feature request;
wherein the step of traversing includes sending feature requests to compiler objects that reside below a particular compiler object when the operator represented by the particular compiler object requires features from the operators represented by the compiler objects that reside below the particular compiler object;
wherein the method is performed by one or more computing devices.

18. The method of claim 17 wherein the step of generating a feature object includes:
sending feature requests to one or more compiler objects in said compiler object tree; and wherein each compiler object contains logic for determining how to respond to feature requests, wherein the logic reflects the semantics of the operator to which the compiler object corresponds.

19. The method of claim 18 wherein:
said query includes a particular operator that is a polymorphic operator; and
said compiler object for said particular operator is designed to respond to multiple types of feature requests.

20. The method of claim 19 wherein the compiler object for the particular operator includes logic for:
providing a first feature object in response to a request for a first type of feature; and
providing a second feature object in response to a request for a second type of feature;
wherein the logic of the first feature object is different than the logic of the second executor object.

21. The method of claim 18, wherein:
the query includes a participate attribute associated with the particular operator; and
the participate attribute determines whether the compiler object associated with the particular operator responds to a feature request.

22. The method of claim 18, wherein:
the query includes a transparency attribute associated with the particular operator; and
the transparency attribute determines whether the compiler object for the particular operator forwards a feature request to a different compiler object in the compiler object tree.

23. The method of claim 17 wherein at least one of the one or more compiler objects responds to the feature requests by providing an execution object used to construct a feature value for an applicable document.

24. The method of claim 17 wherein the step of determining is based, at least in part, on attributes, specified in the query, for the operator associated with the compiler object.

25. One or more storage-readable media storing instructions which, when executed, cause the performance of the method recited in claim 17.

26. A method for extending a query language, the method comprising the steps of:
registering a new operator with a compiler;
wherein the step of registering includes identifying a plug-in that includes first code that encapsulates logic of the new operator;
receiving a query that includes the new operator; and
using the first code that encapsulates logic of the new operator, from the plug-in, to compile the query to produce executable code that includes second code for performing an operation associated with the new operator;
wherein the step of compiling is performed by a compiler associated with a search engine; and
executing the executable code using an execution engine associated with the search engine;
wherein the method is performed by one or more computing devices.

27. The method of claim 26, wherein:
an end user query is received from a user over a network by an application; and
based on the end user query, the application:
converts the end user query into the application query that includes the new operator, and
submits the application query to the search engine.

28. The method of claim 27, further comprising:
before execution of the application query, generating a tree of a plurality of compiler objects based on the application query, wherein each compiler object corresponds to at least one operator in the application query;
sending a feature request from a first compiler object in the tree to a second compiler object in the tree; and
in response to receiving the feature request, the second compiler object returning a feature object, wherein the feature object includes the second code that is executed during execution of the application query.

29. The method of claim 27, wherein the plug-in is provided to the compiler by a designer of the application who is not the designer of the compiler.

30. The method of claim 29, wherein the plug-in includes a definition for a new feature and the new operator is associated with the new feature.

31. The method of claim 26, wherein:
the new operator is a polymorphic operator; and
an object at compile time that corresponds to the new operator is capable of providing more than one type of output.

32. One or more storage-readable media storing instructions which, when executed, cause the performance of the method recited in claim 26.

33. A method for compiling an application query, the method comprising the steps of:
registering, with a compiler, code that references a search primitive of a search engine through an API exposed by the search engine;
receiving, from a search application, at the compiler, an application query;
wherein the search application is designed so that the search application submits a query that includes a particular operator that is associated with the registered code;
in response to the compiler receiving the application query, the compiler generating, based on the operator associated with the registered code, executable code that incorporates the registered code; and
executing the executable code;
wherein the search primitive is from the group consisting of:
document stream feature,
position stream feature, and
a unit operator;
wherein the search primitive is a document stream feature;
in response to executing code associated with the document stream feature the search engine determining a set of documents that contain a set of one or more characters that are included in the query;
wherein the method is performed by one or more computing devices.

34. The method of claim 33, wherein the executable code is executed against an index of a collection of web pages, wherein the index was generated, at least in part, by crawling the Internet.

35. The method of claim 33, wherein:
the code references a second search primitive;
the second search primitive is a position stream feature; and
in response to executing code associated with the position stream feature, the search engine determining a set of positions in a selected document of a set of one or more characters that are included in the query.

36. The method of claim 33, wherein:
the code references a second search primitive;
the second search primitive is a unit operator; and
in response to executing code associated with the unit operator, the search engine identifying at least one of (1)

a document with the input to the unit operator, (2) a position in a particular document of the input, or (3) a score of a particular document based on the input.

37. One or more storage-readable media storing instructions which, when executed, cause the performance of the method recited in claim 33.

38. A method for executing an application query, the method comprising the steps of:
    receiving, at a search engine, the application query, wherein:
       the search engine indexes web-accessible content on a network obtained, at least in part, by crawling the network to discover web-accessible content made available thereon; and
       the application query includes at least one programming construct from the following programming constructs:
          a variable assignment statement,
          a conditional execution statement,
          a list comprehension,
          a participate attribute, and
          a transparent attribute;
    wherein the application query includes the variable assignment statement; and
    compiling, by the search engine, the application query to generate a compiled query; and
    executing, by the search engine, the compiled query;
    in response to receiving the application query, the search engine assigning a value in the variable assignment statement to a variable in the variable assignment statement and using said variable in execution of the compiled query;
    wherein the method is performed by one or more computing devices.

39. The method of claim 38, wherein:
    the application query includes the conditional execution statement; and
    the method further comprising in response to receiving the application query, the search engine executing a particular statement in the conditional execution statement only if the conditional is true.

40. The method of claim 38, wherein:
    the application query includes the list comprehension; and
    the method further comprising in response to receiving the application query, the search engine determines a set of values for a variable by evaluating one or more conditions identified in the list comprehension.

41. The method of claim 38, wherein:
    the application query includes the participate attribute;
    the participate attribute is associated with a particular operator; and
    the participate attribute determines whether, during compilation of the application query, a compiler object associated with the particular operator responds to a feature request.

42. The method of claim 38, wherein:
    the application query includes the transparency attribute;
    the transparency attribute is associated with a particular operator; and
    the transparency attribute determines whether, during compilation of the application query, a compiler object associated with the particular operator forwards a feature request to a different compiler object.

43. One or more storage-readable media storing instructions which, when executed, cause the performance of the method recited in claim 38.

\* \* \* \* \*